United States Patent [19]

Hosono et al.

[11] Patent Number: 4,906,496
[45] Date of Patent: Mar. 6, 1990

[54] DOUBLE-WALLED TUBE ASSEMBLY

[75] Inventors: Masayuki Hosono; Kenji Waragai, both of Sohka; Hirozo Uejo; Mitsuru Tokumoto, both of Ube, all of Japan

[73] Assignees: SMS Corporation, Tokyo; Ube Industries, Ltd., Ube, both of Japan

[21] Appl. No.: 108,088

[22] Filed: Oct. 14, 1987

[30] Foreign Application Priority Data

Oct. 15, 1986 [JP] Japan .................. 61-245071

[51] Int. Cl.$^4$ ............................................ F16L 9/18
[52] U.S. Cl. ...................... 428/36.9; 138/113; 138/114; 428/220; 428/188
[58] Field of Search ............... 138/111, 114, 113; 428/36, 188, 36.9, 220

[56] References Cited

U.S. PATENT DOCUMENTS 4,157,194 6/1979 Takahashi .................. 138/114

FOREIGN PATENT DOCUMENTS 62-113984 5/1987 Japan .

Primary Examiner—James J. Seidleck
Attorney, Agent, or Firm—Burns, Doane, Swecker & Mathis

[57] ABSTRACT

A double-walled tube assembly has an elongate inner tube of thermoplastic resin, and an elongate extruded outer tube of thermoplastic resin including a plurality of ribs having a constant height longitudinally of the outer tube and extending over the entire length of the outer tube, the ribs projecting toward the center of the outer tube. The ribs have distal ends fused to the outer peripheral surface of the inner tube over the entire length of the inner and outer tubes. The rib width is from 0.5 to 1.5 mm. To continuously manufacture the double-walled tube assembly, the pre-molded inner tube is fed to an extrusion molding machine having a cross-head die, and thermoplastic resin is extruded from the cross-head die into an elongate outer tube around the inner tube. The inner tube and the extruded outer tube are fed into a sizing die device, in which the outer tube in a softened state is contracted toward the outer peripheral surface of the inner tube until the distal ends of the ribs of the outer tube are fused to the outer peripheral surface of the inner tube.

11 Claims, 4 Drawing Sheets

DOUBLE-WALLED TUBE ASSEMBLY

BACKGROUND OF THE INVENTION

The present invention relates to an elongate double-walled tube assembly, such as a concentric double-walled tube assembly, of thermoplastic resin particularly nylon, which tube is capable of passing a gas such as air or nitrogen or a fluid such as a liquid, and of being easily coupled to a connector or coupling for controlling operation of a fluid-pressure-operated device, and a method of continuously manufacturing such an elongate double-walled tube assembly with high dimensional accuracy and reproducibility through extrusion molding, using an extrusion molding machine having a cross-head die, and a sizing die device.

One conventional double-walled tube assembly of themoplastic resin and method of manufacturing such a double-walled tube assembly is disclosed in Japanese Patent Publication No. 61-029439, for example.

According to the disclosed manufacturing method, (a) two extrusion molding machines are used, (b) an inner tube and connecting ribs are separately formed by the first extrusion molding machine, (c) thereafter, the inner tube and the connecting ribs are welded and extruded together, (d) an outer tube is extruded by the second extrusion molding machine and is simultaneously joined to the unitary body of the inner tube and connecting ribs by a crosshead associated with the second extrusion molding machine, (e) so that a double-walled tube assembly of an integral structure is produced in which the outer tube and the connecting ribs are separable from each other and the connecting ribs and the inner tube are separable from each other. A double-walled tube assembly (concentric double-walled tube assembly) thus manufactured is illustrated in FIG. 1 of the accompanying drawings.

With the known manufacturing method, the inner tube 5 and the connecting ribs 7 are separately extruded as a unitary body by the first extrusion molding machine. Thereafter the outer tube 6 which is newly extruded by the second extrusion molding machine is melted and integrally joined to the inner tube 5 and the connecting ribs 7 by the crosshead for thereby producing a double-walled tube assembly 8 of thermoplastic resin. Therefore, when the ribs 7 are brought into contact with the melted outer tube 6, the ribs 7 are deformed because of the high temperature of the outer tube 6. Moreover, at the time the inner tube 5, the ribs 7, and the softened outer tube 6 are cooled and solidified after they have been extruded from the crossdie, the outer tube 6 shrinks radially inwardly toward the inner tube 5. As a consequence, double-walled tube assemblies with outer tubes of high dimensional accuracy cannot be manufactured by the conventional method.

In the known double-walled tube assembly 8, the inner tube 5 and the outer tube 6 are fused to each other by the ribs 7 at the opposite side edges of the ribs 7. Therefore, when a connector of a fluid-pressure-operated device is to be joined to the double-walled tube assembly by partly removing the outer tube 6 and the ribs 7 for only exposing a portion of the inner tube 5, it is necessary to separate the outer tube 6 from the ribs 7 at first, and then to separate the ribs 7 from the inner tube 5. Stated otherwise, in order to expose only a portion of the inner tube 5 when putting the double-walled tube assembly to use, an excessive separating process is required.

With the aforesaid conventional method, since the inner tube and the outer tube are independently extruded and then joined to each other, it would substantially be difficult to sufficiently reduce the width of the ribs and hence ribs of large width should be employed for preventing the ribs from being deformed at high temperature. Thus, the outer and inner tubes of the prior double-walled tube assembly are integrally joined to each other by the ribs of large width. The double-walled tube assembly is highly rigid, but not flexible enough to be freely curved or bent for use.

SUMMARY OF THE INVENTION

In view of the aforesaid various problems of the conventional double-walled tube assembly, it is an object of the present invention to provide a double-walled tube assembly of thermoplastic resin which is of high dimensional accuracy, flexible enough, and can easily be attached to a connector, and a method of continuously manufacturing such a double-walled tube assembly through a extrusion molding process using an extrusion molding machine having a cross-head die, and a sizing die device in common.

Another object of the present invention is to provide a double-walled tube assembly comprising an elongate inner tube of thermoplastic resin, and an elongate extruded outer tube of thermoplastic resin including a plurality of ribs having a constant height longitudinally of the outer tube and extending over the entire length of the outer tube, the ribs projecting toward the center of the outer tube, the ribs having distal ends fused to the outer peripheral surface of the inner tube over the entire length of the inner and outer tubes.

Still another object of the present invention is to provide a method of continuously manufacturing a double-walled tube assembly, comprising the steps of continuously feeding an elongate pre-extruded inner tube of thermoplastic resin to an extrusion molding machine having a cross-head die capable of extruding an elongate outer tube of thermoplastic resin with a plurality of ribs of constant height extending over the entire length of the outer tube and projecting from the inner wall surface of the outer tube to the center of the outer tube, continuously extruding thermoplastic resin from the cross-head die into an elongate outer tube around the inner tube, continuously feeding the inner tube and the extruded outer tube into a sizing die device, contracting the outer tube in a softened state toward the outer peripheral surface of the inner tube in the sizing die device until the distal ends of the ribs of the outer tube are fused to the outer peripheral surface of the inner tube, and cooling and solidifying the outer tube.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
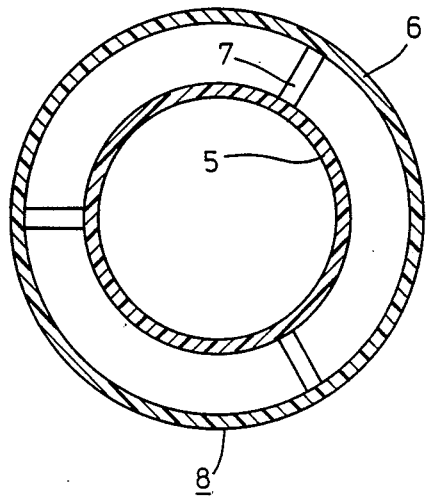
FIG. 1 is a transverse cross-sectional view of a conventional double-walled tube assembly.
Figure 2:
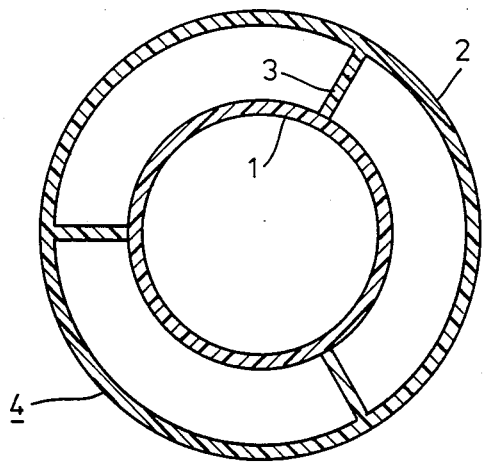
FIG. 2 is a transverse cross-sectional view of a double-walled tube assembly according to the present invention.

As shown in FIG. 2, a double-walled tube assembly 4 according to the present invention comprises an elongate inner tube 1 molded of thermoplastic resin such as nylon (especially, nylon 12, nylon 66, nylon 6, or the like), polyester, polyethylene, polypropylene, or the like, and an outer tube 2 of larger diameter molded of the same thermoplastic resin as that of the inner tube 1, the outer tube 2 having a plurality of angularly spaced ridges or ribs 3 projecting from the inner wall surface thereof toward the central axis thereof. The height of each of the ribs 3 from the inner wall surface of the outer tube 2 to the distal inner end of the rib 3 remains constant in the longitudinal direction of the outer tube 2. The distal inner ends of the ribs 3 are fused to the outer circumferential surface of the inner tube 1 over the entire length of the inner and outer tubes 1, 2, which are disposed substantially concentrically with each other.

Two through six, preferably two through four ribs 3 project from the inner wall surface of the outer tube 2 toward the central axis thereof. Although the double-walled tube assembly 4 of the present invention is not limited to particular dimensions and sizes, it is preferable in the concentric double-walled tube assembly that the outer tube 2 have an outside diameter ranging from 3 to 20 mm, particularly from 4 to 15 mm, and have a wall thickness ranging from 0.1 to 2 mm, particularly from 0.2 to 1.5 mm, that the inner tube 1 have an outside diameter which is 0.2 to 0.9 times, particularly 0.4 to 0.8 times, that of the outer tube 2, and a wall thickness ranging from 0.05 to 2 mm, particularly from 0.1 to 0.5 mm, and that each of the ribs 3 have a height (distance from the inner wall surface of the outer tube to the distal end of the rib) ranging from 0.4 to 8 mm, particularly from 0.5 to 6 mm, and a width (in a direction normal to the direction in which the rib projects from the outer tube to the inner tube) smaller than about 2 mm, particularly in the range of from 0.1 to 1.5 mm. Each rib 3 is of constant width as depicted in FIG. 2. These outer diameters, wall thicknesses, height, and width, as numerically defined above, are suitable when the double-walled tube assembly 4 is used for passing different gases such as air and nitrogen, for example, separately therethrough.

Since the ribs 3 are integrally joined to and project directly from the inner wall surface of the outer tube 2 and the joint between the outer peripheral surface of the inner tube 1 and the distal ends of the ribs 3 is not mechanically strong enough, the inner tube 1 can easily be exposed partly simply by separating the outer tube 2 of larger diameter than from the inner tube 1.

The inner tube 1 can easily be exposed partly as described above, and the various components of the double-walled tube assembly 4 have high dimensional accuracy. Consequently, a connector, joint terminal, or coupling of metal or the like can easily be fitted over the double walled tube assembly 4.

Figure 5:
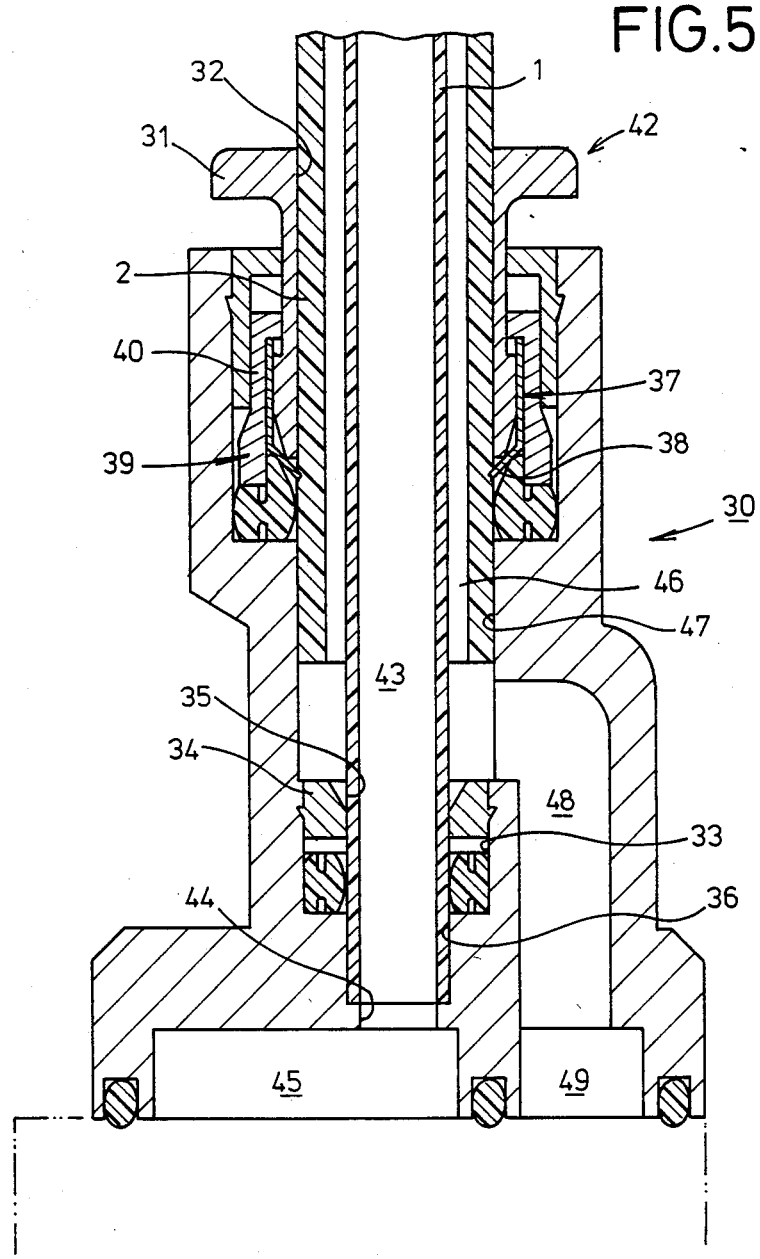
FIG. 5 is a cross-sectional view of a coupling to which the double-walled tube assembly of the present invention is connected.

As shown in FIG. 5, for connecting the double-walled tube assembly 4 to a coupling or tube connecting mechanism 42, tee outer tube 2 is removed from the end of the inner tube 1 over a prescribed length, and then the double-walled tube assembly 4 is inserted in a hole 32 defined in a release bushing 31 of a main body 30 of the tube connecting mechanism 42, with the inner tube 1 extending through a hole 35 defined in a support member 34 disposed in a hole 33 in the main body 30 and being fitted in a hole 36 in the main body 30. The outer tube 2 is fitted in the hole 32 of the release bushing 31 and has its outer peripheral surface penetrated by teeth 38 of a chuck 37 under their resiliency and resilient members 40 of a collet 39 under their resiliency. The double-walled tube assembly 4 is thus retained in the tube connecting mechanism 42.

When the double-walled tube assembly 4 is thus fitted in the main body 30 of the coupling 42, a passage 43 defined in the inner tube 1 communicates with an opening 45 through a hole 44 in the coupling 42, and a passage 46 defined between the outer tube 2 and the inner tube 1 communicates with an opening 49 in the coupling 42 through a passage 48 connected to a hole 47 in which the outer tube 2 is inserted.

The other end of the double-walled tube assembly 4 is then connected to an actuator (not shown). When a solenoid-operated valve manifold is operated, a fluid under pressure can be supplied from the opening 45 via the passage 43 of the inner tube 1 to the actuator, and a fluid under pressure supplied to the opening 49 can flow through the passage 48 and the hole 47 and then the passage 46 of the double-walled tube assembly 4 into the actuator.

Figure 4:
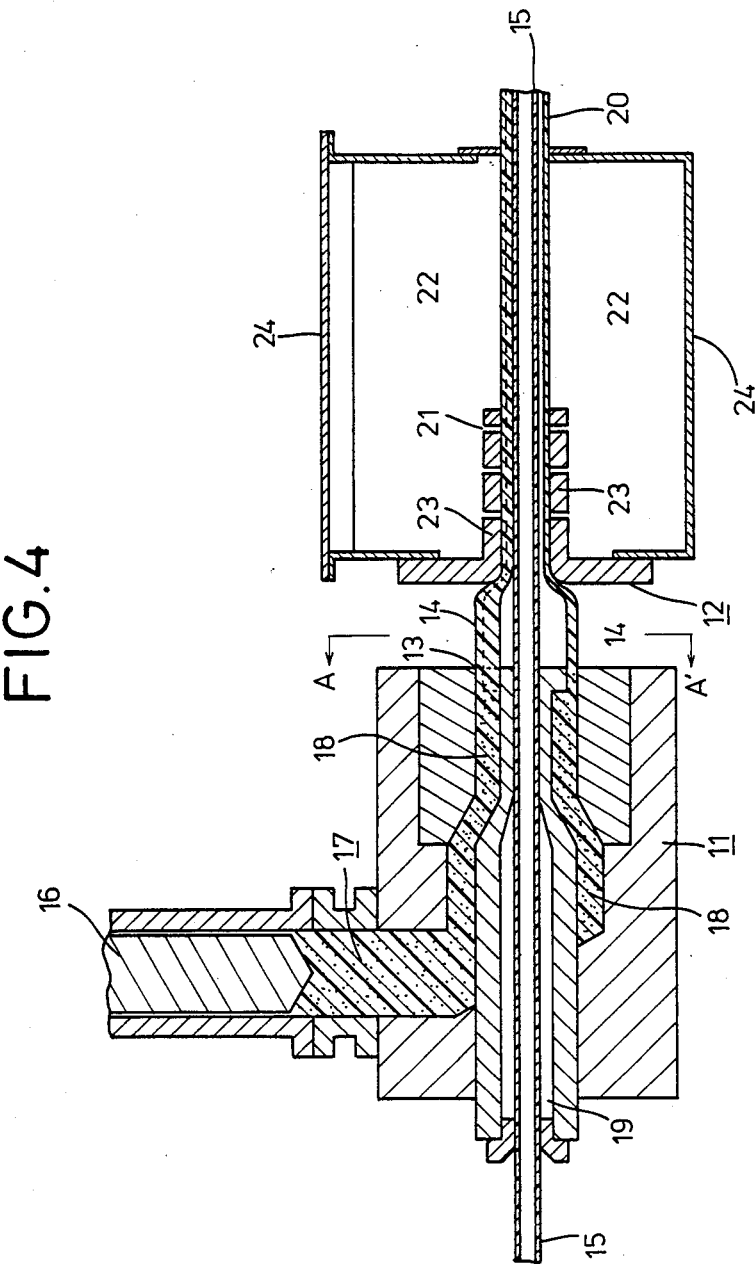
FIG. 4 is a cross-sectional view of the extrusion molding machine and the sizing die device.

The double-walled tube assembly 4 can be molded by an extrusion molding machine having a cross-head die 11, and a sizing die 12 in common, as shown in FIG. 4.

As shown in FIG. 4, the extrusion molding machine used for continuously manufacturing the double-walled tube assembly 4 has a resin passage 18 and a discharge port 13 capable of extruding a melted mass 17 of thermoplastic resin supplied by a feed screw 16 as an elongate outer tube 14 (indicated at 2' in FIG. 3) having a plurality of ridges or ribs (indicated at 3' in FIG. 3) of constant height projecting toward the center of the outer tube and extending the entire length of the inner wall surface of the outer tube.

The extrusion molding machine also has a cross-head die 11 having an inner tube insertion passage 19 capable of feeding an elongate inner tube 15 (indicated at 1' in FIG. 3) that has separately been extrusion-molded of thermoplastic resin, centrally through the resin passage 18 and the discharge port 13, which are defined in the cross-head die 11.

Figure 3:
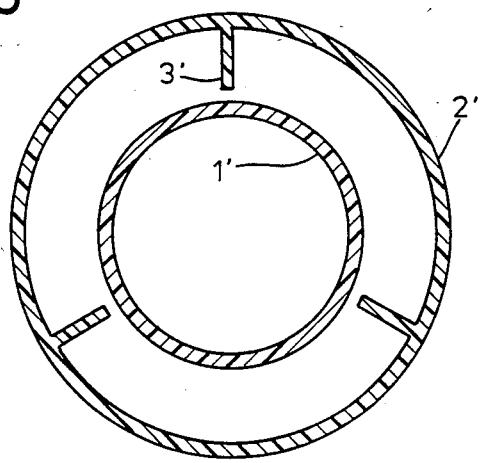
FIG. 3 is a transverse cross-sectional view taken along line A—A' of FIG. 4, showing an outer tube of irregular cross-sectional shape is extruded around an inner tube by an extrusion molding machine.

According to a manufacturing method of the present invention, the elongate inner tue 15 is continuously fed through the cross-head die 11, while the melted mass 17 of thermoplastic resin flowing from the resin passage 18 is being discharged from the discharge port 13 to extrude the outer tube 2' concentrically around the inner tube 1' as shown in FIG. 3.

The outer tube 14 immediately after it is extruded from the discharge port 13 of the cross-head die 11 is not in direct contact with the outer peripheral wall of the inner tube 15 as it emerges centrally from the cross head die 11. As shown in FIG. 3, it is preferable that the outer peripheral surface of the inner tube 1' and the distal ends of the ribs 3' of the outer tube 3' be spaced from each other by a distance of about 0.5 mm or more, particularly in the range of from 0.5 to 5 mm.

Before the inner tube 15 and the melted outer tube 14 discharged from the cross-head die 11 are then fed to a sizing die device as shown in FIG. 4, the outer peripheral surface of the outer tube 14 is cooled by ambient cooling air brought into contact therewith, changing the outer tube 14 from the melted state to a stabler softened state. The outer tube 14 is thus prevented from being excessively deformed due to its flowability.

As shown in FIG. 4, the inner tube 15 and the softened outer tube 14 are continuously fed together into a sizing die 12 of the sizing die device. In the sizing die device, the softened outer tube 14 is contracted or shrinked toward the outer peripheral surface of the inner tube 15 until the distal ends of the ribs of the outer tube 14 are fused to the outer peripheral surface of the inner tube 15. At the same time, the outer tube 14 is cooled and solidified while its outer profile is being adjusted. Finally, a double-walled tube assembly 20 with the inner tube 15 and the outer tube 14 integrally joined to each other is produced.

The sizing die device may be of any construction insofar as it can contract the softened outer tube extruded from the cross-head die 11 toward the outer peripheral surface of the inner tube and also can cool and solidify the outer tube while adjusting its outer profile to shape.

For example, as shown in FIG. 4, (a) The inlet of the sizing die 12 is of a flared shape and a tubular wall 23 defining a passage for the double-walled tube assembly has an inside diameter of a predetermined desired value.

(b) A coolant flows in or around the tubular wall 23 for cooling the tubular wall 23.

(c) The tubular wall 23 has several small through holes 21 extending radially between its outer and inner surfaces.

(d) The sizing die 12 is sealingly housed in a casing 24 joined to the sizing die 12 and connected to an evacuating device capable of evacuating the space around the sizing die 12 to a pressure of about 500 mmHg or lower.

In the sizing device of the above structure, the softened outer tube 14 extruded from the cross-head die 11 is fed into the passage in the sizing die 12 and forcibly contracted or reduced in diameter to the inside diameter of the tubular wall 23 in the sizing die 12. Since the space 22 around the tubular wall 23 in the casing 24 is evacuated, the outer tube 14 is attracted under suction through the small through hole 21 against the inner surface of the tubular wall 23 while the outer tube 14 is being moved therethrough. The outer tube 14 is also cooled and solidified by the coolant flowing in or around the tubular wall 23. As a result, in the double-walled tube assembly 20 thus manufactured, the outer profile of the outer tube 14 is adjusted with accuracy to its desired dimension, and the distal ends of the ribs of the outer tube 14 are fused to the outer peripheral surface of the inner tube 15.

The coolant flowing in or around the tubular wall 23 in the sizing die 12 may be a cooling gas, cooling water, or the like.

The present invention resides in that a separately pre-molded inner tube is fed to an extrusion molding machine having a cross-head die, and an outer tube of having ribs is extruded around the inner tube by the cross-head die, and then the inner tube and the outer tube are supplied into a sizing die device in which they are fused together, thus producing a double-walled tube assembly which is high dimensional accuracy and is flexible enough. This method of continuously manufacturing a double-walled tube assembly using an extrusion molding machine with a cross-head die and a sizing die device has not been known heretofore.

An example of a double-walled tube assembly manufactured according to the above method will be described below.

Pellets of nylon 12 (UBE nylon 3035JU5 manufactured by Ube Industries, Ltd.) were used as thermoplastic resin. A tube die was attached to a 40 mm-extrusion molding machine, and the pellets were melted and extruded at a temperature of 190° C. The extrudate was then passed through a vacuum-type sizing die to form an elongate tube (inner tube) having an outside diameter of 3.4 mm and a wall thickness of 0.4 mm.

While the inner tube thus pre-formed was being fed into the 40 mm-extrusion molding machine with the cross-head die as shown in FIG. 4, pellets of nylon 12 (which was the same as that of the inner tube) were supplied, melted, and extruded from the cross-head die into an outer tube around the inner tube at a temperature of 190° C.

The die lip of the cross-head die had grooves defined in its inner surface for forming three ribs as shown in FIG. 3.

The inner tube and the melted and softened outer tube which were continuously discharged from the cross-head die were continuously fed into a vacuum-type sizing die in which the distal ends of the ribs of the outer tube were fused to the outer peripheral surface of the inner tube, and at the same time, the outer tube was cooled and solidified. Thus, a double-walled tube assembly was continuously manufactured in which the distal ends of the ribs of the outer tube were fused to the outer peripheral surface of the inner tube.

With the double-walled tube assembly thus fabricated, the outer tube had an outside diameter of 6.4 mm and a wall thickness of 0.8 mm, and each of the ribs had an average height of 0.7 mm and a width of 0.3 mm.

The inner tube, immediately before it was fed to the cross-head die, was preheated to about 150° C. in order to allow the outer peripheral surface of the inner tube to be easily fused to the ribs of the outer tube.

The double-walled tube assembly thus manufactured had a bending strength of 820 g (testing method: JIS K 7203, the length of a sample: 100 mm, the distance between supporting points: 80 mm, the test speed: 2 mm/min.), which is substantially the same as the bending strength of 950 g (tested by the same testing method as above) of a single-walled tube (having an outside diameter of 6.4 mm and a wall thickness of 0.8 mm). Therefore, the double-walled tube assembly was flexible enough to be freely curved or bent in the same manner as the single-walled tube.

The double-walled tube assembly of concentric configuration was of high quality in that it was easy to partly expose the inner tube and the tube assembly had a sufficient degree of dimensional stability for permitting itself to be easily fitted in the connector or coupling shown in FIG. 5.

Since a double-walled assembly of the present invention is continuously manufactured of thermoplastic resin by extrusion molding, it is of high dimensional accuracy and retains a desired degree of flexibility.

Inasmuch as the inner tube can easily be centered, the double-walled tube assembly can be joined to a connector or coupling with utmost ease.

The method of the present invention can continuously manufacture a double-walled tube assembly of thermoplastic resin with high dimensional accuracy on an industrial basis.

Although a certain preferred embodiment has been shown and described, it should be understood that many changes and modifications may be made therein without departing from the scope of the appended claims.

What is claimed is:

1. A double-walled tube assembly comprising:
   an elongate inner tube of thermoplastic resin;
   an elongate extruded outer tube of thermoplastic resin including a plurality of ribs having a constant height longitudinally of the outer tube and extending over the entire length of the outer tube, said ribs projecting from the inner wall surface of the outer tube toward the center of said outer tube; and
   said ribs having distal ends fused to the outer peripheral surface of said inner tube over the entire length of said inner and outer tubes; wherein said ribs range from 2 to 4 in number and each rib has a substantially constant width in the range of from about 0.1 to 1.5 mm.

2. A double-walled tube assembly according to claim 1, wherein said outer and inner tubes are concentric with each other, said outer tube having an outside diameter ranging from 3 to 20 mm.

3. A double-walled tube assembly according to claim 1, wherein said outer and inner tubes are concentric with each other, said outer tube having a wall thickness ranging from 0.1 to 2 mm.

4. A double-walled tube assembly according to claim 1, wherein said outer and inner tubes are concentric with each other, said inner tube having an outside diameter which is 0.2 to 0.9 times that of said outer tube.

5. A double-walled tube assembly according to claim 1, wherein said outer and inner tubes are concentric with each other, said inner tube having a wall thickness ranging from 0.05 to 2 mm.

6. A double-walled tube assembly according to claim 1, wherein said outer and inner tubes are concentric with each other, said distal ends of said ribs being spaced from the inner wall surface of said outer tube by a distance ranging from 0.4 to 8 mm.

7. A double-walled tube assembly according to claim 2, wherein said outer tube has an outside diameter ranging from about 4 to 15 mm.

8. A double-walled tube assembly according to claim 3, wherein said outer tube has a wall thickness ranging from 0.2 to 1.5 mm.

9. A double-walled tube assembly according to claim 4, wherein said inner tube has an outside diameter which is about 0.4 to 0.8 times that of said outer tube.

10. A double-walled tube assembly according to claim 5, wherein said inner tube has a wall thickness ranging from about 0.1 to 1.5 mm.

11. A double-walled tube assembly according to claim 6, wherein said distance ranges from about 0.5 to 6 mm.

* * * * *